(12) United States Patent
Starkie

(10) Patent No.: US 8,046,227 B2
(45) Date of Patent: Oct. 25, 2011

(54) DEVELOPMENT SYSTEM FOR A DIALOG SYSTEM

(75) Inventor: Bradford Craig Starkie, Surrey Hills (AU)

(73) Assignee: Telestra Corporation Limited, Melbourne, Victoria (AU)

( * ) Notice: Subject to any disclaimer, the term of this patent is extended or adjusted under 35 U.S.C. 154(b) by 1489 days.

(21) Appl. No.: 10/526,552

(22) PCT Filed: Sep. 5, 2003

(86) PCT No.: PCT/AU03/01155
§ 371 (c)(1),
(2), (4) Date: Apr. 4, 2006

(87) PCT Pub. No.: WO2004/023332
PCT Pub. Date: Mar. 18, 2004

(65) Prior Publication Data
US 2006/0203980 A1      Sep. 14, 2006

(30) Foreign Application Priority Data
Sep. 6, 2002   (AU) ................................. 2002951244

(51) Int. Cl.
*G10L 21/00* (2006.01)
(52) U.S. Cl. ..................... 704/270.1; 704/257; 704/275; 704/231; 704/9; 715/978; 715/841; 715/707; 379/88.18; 370/352
(58) Field of Classification Search ............... 704/270.1, 704/270, 275, 257, 251, 231, 9; 706/11, 706/45, 61; 715/978, 841, 707; 705/26; 379/88.18, 265.05; 707/999.104; 717/104, 717/170; 719/328; 370/352
See application file for complete search history.

(56) References Cited

U.S. PATENT DOCUMENTS

| | | | |
|---|---|---|---|
| 5,241,619 A | | 8/1993 | Schwartz et al. |
| 5,452,397 A | * | 9/1995 | Ittycheriah et al. ........... 704/240 |
| 5,642,519 A | | 6/1997 | Martin |

(Continued)

FOREIGN PATENT DOCUMENTS

EP       0 992 980 A2      4/0000

(Continued)

OTHER PUBLICATIONS

Ahonen, H., et al., "*Forming Grammars for Structured Documents: An Application of Grammatical Inference,*" Procedure of the Second International Colloquium on Grammatical Inference and Applications, (1994) pp. 153-167.

(Continued)

*Primary Examiner* — Vijay Chawan
(74) *Attorney, Agent, or Firm* — Nixon Peabody LLP

(57) ABSTRACT

A development system, including a scenario generator for generating a plurality of sample interactions representative of interactions between a dialog system and a user of the dialog system on the basis of definition data for the dialog system. The definition data includes state machine code, prompt data, and recognition data. A simulator generates prompts of sample interactions on the basis of the prompt data, and the scenario generator generates responses to the prompts on the basis of the recognition data. A scenario editor allows a user to modify the sample interactions. A grammar learner then updates the prompt data and the recognition data on the basis of the modified sample interactions. An application builder generates the definition data from specification data provided by a developer, an application template, and/or an existing dialog application.

29 Claims, 7 Drawing Sheets

U.S. PATENT DOCUMENTS

| | | | |
|---|---|---|---|
| 5,737,723 | A | 4/1998 | Riley et al. |
| 5,860,063 | A | 1/1999 | Gorin et al. |
| 5,937,385 | A | 8/1999 | Zadrozny et al. |
| 6,016,470 | A | 1/2000 | Shu |
| 6,044,347 | A | 3/2000 | Abella et al. |
| 6,058,166 | A * | 5/2000 | Osder et al. ............... 379/88.22 |
| 6,144,938 | A | 11/2000 | Surace et al. |
| 6,154,722 | A | 11/2000 | Bellegarda |
| 6,173,261 | B1 | 1/2001 | Arai et al. |
| 6,246,986 | B1 * | 6/2001 | Ammicht et al. ............. 704/270 |
| 6,269,336 | B1 | 7/2001 | Ladd et al. |
| 6,314,402 | B1 | 11/2001 | Monaco et al. |
| 6,321,198 | B1 * | 11/2001 | Hank et al. .................... 704/270 |
| 6,411,952 | B1 | 6/2002 | Bharat et al. |
| 6,434,521 | B1 * | 8/2002 | Barnard ........................ 704/244 |
| 6,490,698 | B1 * | 12/2002 | Horvitz et al. .................. 714/46 |
| 6,493,673 | B1 | 12/2002 | Ladd et al. |
| 6,510,411 | B1 | 1/2003 | Norton et al. |
| 6,523,016 | B1 | 2/2003 | Michalski |
| 6,539,359 | B1 * | 3/2003 | Ladd et al. .................... 704/275 |
| 6,560,576 | B1 * | 5/2003 | Cohen et al. .................. 704/270 |
| 6,587,822 | B2 | 7/2003 | Brown et al. |
| 6,604,075 | B1 * | 8/2003 | Brown et al. ............. 704/270.1 |
| 6,618,697 | B1 | 9/2003 | Kantrowitz et al. |
| 6,684,183 | B1 | 1/2004 | Korall et al. |
| 6,748,191 | B2 * | 6/2004 | Yamamoto et al. ............ 399/323 |
| 6,914,975 | B2 * | 7/2005 | Koehler et al. .......... 379/265.05 |
| 7,013,263 | B1 * | 3/2006 | Isaka et al. ........................ 704/9 |
| 7,143,040 | B2 * | 11/2006 | Durston et al. ............... 704/270 |
| 7,149,287 | B1 * | 12/2006 | Burger et al. .............. 379/88.17 |
| 7,177,815 | B2 * | 2/2007 | Ehlen et al. ................. 704/270.1 |
| 7,177,816 | B2 * | 2/2007 | Ehlen et al. ................. 704/270.1 |
| 7,216,351 | B1 * | 5/2007 | Maes ........................... 719/328 |
| 7,260,530 | B2 * | 8/2007 | Werner ......................... 704/251 |
| 7,376,620 | B2 * | 5/2008 | Kay et al. ......................... 705/40 |
| 7,653,545 | B1 * | 1/2010 | Starkie ........................... 704/275 |
| 2001/0013001 | A1 | 8/2001 | Brown et al. |
| 2001/0016074 | A1 | 8/2001 | Hamamura |
| 2002/0087325 | A1 | 7/2002 | Lee et al. |
| 2002/0188454 | A1 | 12/2002 | Sauber |
| 2003/0007609 | A1 | 1/2003 | Yuen et al. |
| 2003/0055651 | A1 | 3/2003 | Pfeiffer et al. |
| 2003/0069729 | A1 | 4/2003 | Bickley et al. |
| 2003/0130849 | A1 * | 7/2003 | Durston et al. ............... 704/270 |
| 2004/0015350 | A1 | 1/2004 | Gandhi et al. |
| 2005/0043953 | A1 * | 2/2005 | Winterkamp et al. ........ 704/275 |
| 2005/0091057 | A1 | 4/2005 | Phillips et al. |
| 2005/0152344 | A1 * | 7/2005 | Chiu et al. .................... 370/352 |
| 2006/0025997 | A1 * | 2/2006 | Law et al. ..................... 704/257 |
| 2006/0190252 | A1 | 8/2006 | Starkie |
| 2006/0203980 | A1 | 9/2006 | Starkie |
| 2008/0126078 | A1 * | 5/2008 | Starkie .............................. 704/9 |
| 2008/0126089 | A1 * | 5/2008 | Printz et al. ................... 704/235 |
| 2008/0319738 | A1 | 12/2008 | Liu et al. |

FOREIGN PATENT DOCUMENTS

| | | |
|---|---|---|
| EP | 0 685 955 A2 | 12/1995 |
| EP | 0 700 031 A1 | 3/1996 |
| EP | 0 890 942 A2 | 1/1999 |
| EP | 1 207 518 A2 | 5/2002 |
| EP | 0 312 209 B1 | 12/2002 |
| WO | WO 98/50907 A1 | 11/1998 |
| WO | WO 99/14689 A1 | 3/1999 |
| WO | WO 00/05708 A1 | 2/2000 |
| WO | WO 00/51016 | 8/2000 |
| WO | WO 00/78022 | 12/2000 |
| WO | WO 00/78022 A1 | 12/2000 |
| WO | WO 02/37268 A2 | 5/2002 |
| WO | WO 02/063460 A2 | 8/2002 |
| WO | WO 02/103673 A1 | 12/2002 |
| WO | WO 2004/010678 | 1/2004 |

OTHER PUBLICATIONS

Frost, R.A., "*Speechnet: A Network of Hyperlinked Speech-Accessible Objects*," International Conference on Advanced Issues of E-Commerce and Web-Based Information Systems, WECWIS, Ontario, Canada, (Apr. 8-9, 1999) pp. 116-121.

Minker, W., "*Stochastic Versus Rule-Based Speech Understanding for Information Retrieval*," Speech Communications 25, Spoken Language Processing Group, LIMSI-CNRS, Orsay Cedex, France, (1998) pp. 223-247.

Nevill, C., et al., "*Compression and Explanation Using Hierarchical Grammars*," Computer Science Department, University of Waikato, New Zealand, The Computer Journal, vol. 40, No. 2/3, (1997) pp. 103-116.

Nuance V-Builder 2.0 NVP Edition Technical Data Sheet, <http://www.nuance.com/assets/pdf/vbuilder_tech_data_sheet_1102.pdf>, (2002) pp. 1-2.

Nuance V-Builder Web Page, <http://web.archive.org/web/20020201161856/www.nuance.com/products/vbuilder.html>, (2002) pp. 1-2.

Ramming, J. C., "*PML: A Language Interface to Distributed Voice-Response Units*," Lecture Notes in Computer Science, vol. 1686, (1998) pp. 97-112.

Stolcke, A., "*Bayesian Learning of Probabilistic Language Models*," Dissertation, University of California at Berley, (1994) pp. 1-84.

Telera AppBuilder Data Sheet, <http://telera.com/stageone/files/Telera/collateral/app_builder_3-2-_hi.pdf>, (2002) pp. 1-2.

The Voice Web Application Development Environment, Telera White Paper, <http://telera.com/stageone/files/Telera/collateral/AppDev_WP_4-18-02.pdf., (2001) pp. 1-8.

Voxeo Designer 2.0 Web Page, <http://web.archive.org/web/20020205091431/community/voxeo.com/vd2.isp>, (2002) pp. 1-10.

Allen, J., "*Natural Language Understanding*," The Benjamin/Cummings Publishing Company Inc., Redwood City, CA USA (1995) pp. 46-53.

Garofolo, J., et al., "*THE DARPA TIMIT Acoustic-Phonetic Continuous Speech Corpus*," NIST Speech Disc CD1-1.1, (Oct. 1990) pp. 342.

Levenstein, V. I., "*Binary Codes Capable of Correcting Deletions, Insertions, and Reversals*," Soviet Physics-Doklady, vol. 10, No. 9, (Feb. 1966) pp. 707-710.

Mitchell, T. M., "*Machine Learning*," Chapter 7. Computational Learning Theory, McGraw-Hill, Boston, MA USA (1997) pp. 201-227.

Rabiner, L. R., et al., "*Fundamentals of Speech Recognition*," Chapter 2. The Speech Signal: Production, Perception, and Acoustic-Phonetic Characterization, Prentice Hall, Englewood Cliffs, New Jersey USA (1993) pp. 11-37.

Ryan, T. P., "*Modern Regression Methods*," John Wiley and Sons, Inc. (1996) pp. 21-30.

Aho, A. V., et al., "*The Theory of Parsing, Translation, and Compiling*," Prentice-Hall, Englewood Cliffs, New Jersey, (1972) p. 146.

Angluin, D., "*Inference of Reversible Languages*," Journal of the Association for Computational Machinery, vol. 29, No. 3, (1982) pp. 741-765.

Knuth, D. E., "*Semantics of Context-Free Languages*," originally published in Mathematical Systems Theory 2, (1968) pp. 127-145, republished in "Selected Papers in Computer Languages," CSLI Publications, Center for the Study of Languages and Information, (2003) pp. 377-400.

Harris, Z. S., "*Structural Linguistics*," University of Chicago Press, Chicago, IL, USA and London, UK, 7th edition (1966), formerly entitled: "Methods in Structural Linguistics," (1951) pp. 243-299.

ISO/IEC 13211-1:1995, "*Information Technology—Programming languages—Prolo—Part 1: General core*," International Organization for Standardization, New York, New York, (1995) pp. 1-199.

Oates, T., et al.,"*Learning k-Reversible Context-Free Grammars from Positive Structural Examples*," Department of Computer Science and Electrical Engineering, University of Maryland Baltimore County, Baltimore, MD, pp. 1-7.

Sakakibara, Y., "*Efficient Learning of Context-Free Grammars from Positive Structural Examples*," Information and Computation 97, (1992) pp. 23-60.

Starkie, B., "*Inferring Attribute Grammars with Structured Data for Natural Language Processing*," 6th International Colloquium; ICGI 2002, Berlin Germany: Springer-Verlag, (2002) pp. 1-12.

Thomas, I., et al., "*Extracting Phoneme Pronunciation Information from Corpara*," Proceedings of the Joint Conference on New Methods in Language Processing and Computational Language Learning, Association for Computational Linguistics, Somerset, New Jersey, (1998) pp. 175-183.

Levin, et al., *A Stochastic Model of Human-Machine Interaction for Learning Dialog Strategies*, IEEE Transactions on Speech and Audio Processing, (Jan. 2000) pp. 11-23, vol. 8, No. 1, New York, NY US, Publisher Item Identifier S 1063-6676(00)00296-0.

Lopez-Cozar, et al., *Testing Dialogue Systems by Means of Automatic Generation of Conversations*, Interacting with Computers, Science Direct-on-line, (Jul. 2002) Elsevier Science B.V. Issn: 0953-5438, pp. 1-21, XP-002569525, http://www.sciencedirect.com, European Patent Office, http://dx.doi.org/10.1016/S0953-5438(02)0019-X> [Retrieved on Feb. 19, 2010 from the Internet].

Starkie, et al., *Lyrebird: Developing Spoken Dialog Systems Using Examples*, Telstra New Wave Pty Ltd., Jan. 1, 2002 XP-002519592, URL: http://www.springerlink.com/content/9fq6d51u0mqa7mtj/>, pp. 1-3.

Starkie, *Programming Spoken Dialogs Using Grammatical Inference*, Telstra New Wave Pty Ltd., AI 2001 Advances in Artificial Intelligence, XP002519591, pp. 449-460.

Gold, E. M., "*Language Identification in the Limit*," Academic Press (1967), pp. 447-474.

Hunt, A., et al., Speech Recognition Grammar Specification Version 1.0 <http://www.w3.org/TR/speech-grammar/>, W3C Recommendation, (2004) pp. 1-94.

Van Zaanen, M., "*Bootstrapping Structure into Language: Alignment-Based Learning*," Phd Thesis, The University of Leeds School of Computing, (2001), pp. i-xi and 1-128.

VoiceXML Forum, <http://www.voicexml.org>, (2007) pp. 1-2.

Takashi Yokomori, "Polynomial-time Identification of Very Simple Grammars from Positive Data," Elsevier, Theoretical Computer Science 298 (2003) 179-206; 28 pages.

Adreas Stolcke, et al.; "Inducing Probabilistic Grammars by Bayesian Model Merging," International Computer Science Institute, XP-002381959, cmp-lg/9409010 Sep. 13, 1994; 14 pages.

Pat Langley et al., "Learning Context-Free Grammars with a Simplicity Bias," DaimlerChrysler Research and Technology Center, XP-002384887.

EP 04 73 0163 Supplementary Partial European Search Report, Dated Jul. 21, 2011.

\* cited by examiner

DEVELOPMENT SYSTEM FOR A DIALOG SYSTEM

FIELD OF THE INVENTION

The present invention relates to a development system for a dialog system, and in particular to a system and process for developing a natural language interactive dialog system.

BACKGROUND

A dialog system has a text or audio interface, allowing a human to interact with the system. Particularly advantageous are 'natural language' dialog systems that interact using a language syntax that is 'natural' to a human. A dialog system is a computer or an Interactive Voice Response (IVR) system that operates under the control of a dialog application that defines the language syntax, and in particular the prompts and grammars of the syntax. For example, IVRs, such as Nortel's Periphonics™ IVR, are used in communications networks to receive voice calls from parties. An IVR is able to generate and send voice prompts to a party and receive and interpret the party's voice responses made in reply. However, the development of a dialog system is cumbersome and typically requires expertise in both programming and the development of grammars that provide language models. Consequently, the development process is often slower than desired.

One approach to reducing the time and expertise of developing natural language dialog systems is to use processes whereby a relatively small amount of data describing the task to be performed is provided to a development system. The development system can then transform this data into system code and configuration data that can be deployed on a dialog system, as described in International Patent Publication number WO 00/78022, A Method of Developing An Interactive System ("Starkie"). However, one difficulty of this process is that the development system needs to make numerous assumptions, some of which may result in the creation of prompts that, while understandable to most humans, could be expressed in a manner more easily understood by humans. For example, a prompt may be created that prompts a person to provide the name of company whose stocks they wish to purchase. The development system might create a prompt such as "Please say the company", whereas the phrase "Please say the name of the company whose stocks you wish to purchase" may be more understandable to a human interacting with the dialog system.

Another approach, described in Starkie, for reducing the time and expertise requirements for developing a natural language dialog system is to use processes whereby developers provide examples of sentences that a human would use when interacting with the dialog system. A development system can convert these example sentences into a grammar that can be deployed on a computer or IVR. This technique is known as grammatical inference. Successful grammatical inference results in the creation of grammars that:
 (i) cover a large proportion of the phrases that people will use when interacting with the dialog system;
 (ii) attach the correct meaning to those phrases
 (iii) only cover a small number of phrases that people won't use when interacting with the dialog system; and
 (iv) require the developer to provide a minimal number of example phrases.

The use of grammatical inference to build a dialog system is an example of development by example, whereby a developer can specify a limited set of examples of how the dialog system should behave, rather than developing a system that defines the complete set of possible examples.

Thus a development system can be provided with a list of interactions between a human and a dialog system using a notation that lists the sentences in the order they are spoken or written, indicating whether it is either the dialog system or the human that is speaking (or writing). This is referred to as an example interaction. Similarly, an example interaction can be defined by recording or transcribing the interactions between two or more humans. A benefit of this technique is that example interactions are understandable to anybody who understands the language contained within them. In addition, most people would be capable of creating example interactions of desired behaviour. There is also the benefit that example interactions describe specific behaviours, given a set of inputs, and therefore provide test cases for the behaviour of the dialog system. As they document specific behaviour, there is also a reduced risk of errors being introduced in the specification of the dialog system for the given behaviour listed in the example interactions. Example interactions are also ideal forms of documentation to describe the behaviour of the dialog system to others.

Example interactions can be annotated to include high level descriptions of the meaning of a sentence. This annotation might include the class of the sentence, and any key pieces of information contained in the phrase, known as slots. For example, the sentence "I want to buy three hundred acme bolt shares" might be annotated to signify that the class of the sentence is buy_stocks as opposed to sell_stocks, and that the quantity slot of the sentence is 300, while the stockname slot is "acme bolt".

An example interaction can be converted into a model that describes a sequence of sentence classes. One example of such a model is a state machine. A state machine is a model that causes an action or output to take place, depending upon the input it receives. A state machine can react differently to the same input, depending upon its current state. The state of a state machine can also change depending upon the input it receives. For example, a dialog system may respond differently to the sentence "yes i'm sure" depending upon whether it has just asked the question "are you sure you want to quit?" or the sentence "are you sure that you want to buy three hundred shares of acme bolt?".

Grammatical inference techniques can be used to create a state machine that can generate a sequence of symbols, using an example set of sequences. These techniques are typically applied to the creation of a class of grammars known as regular grammars. As a result, a state machine that defines all of the valid sequences of sentence classes in a dialog system can be inferred from a limited set of example interactions. To do this with a minimal number of training examples requires some assumptions to be made. In particular, this approach suffers from the following difficulties:
 (i) The example dialogs need to be constrained in some way to allow easy generalisation. For instance, it is extremely difficult, if not impossible, for a current state of the art development system to automatically build a dialog system from a set of example interactions between two humans.
 (ii) Specifying a dialog system using only a set of example interactions may require a large number of example interactions. The difficulty in doing this may outweigh any benefit of reduced speed of development.
 (iii) Sentences in the set of example interactions need to be annotated consistently.
 (iv) A set of example interactions contains only information that is visible to someone interacting with the dialog system. Example interactions contain sentences created by the dialog system and the human interacting with it, but not the sequence of internal interactions required to make decisions as to what sentences should be spoken by the dialog system.

Thus a development system for dialog systems that uses only example interactions is unlikely to meet the objectives of reduced development time and expertise. It is desired to provide a system and process for developing a dialog system that alleviate one or more of the above difficulties, or at least provide a useful alternative to existing development systems and processes.

SUMMARY OF THE INVENTION

In accordance with the present invention, there is provided a process for developing a dialog system, including generating a plurality of sample interactions representative of interactions between said dialog system and a user of said dialog system on the basis of definition data for said dialog system.

The present invention also provides a development system, including a scenario generator for generating a plurality of sample interactions representative of interactions between a dialog system and a user of said dialog system on the basis of definition data for said dialog system.

The present invention also provides a graphical user interface for use in developing a dialog system, said interface including graphical user interface components for modifying sample interactions representative of interactions between said dialog system and a user of said dialog system.

BRIEF DESCRIPTION OF TIRE DRAWINGS

Preferred embodiments of the present invention are hereinafter described, by way of example only, with reference to the accompanying drawings, wherein.

DETAILED DESCRIPTION OF THE PREFERRED EMBODIMENTS

Figure 1:
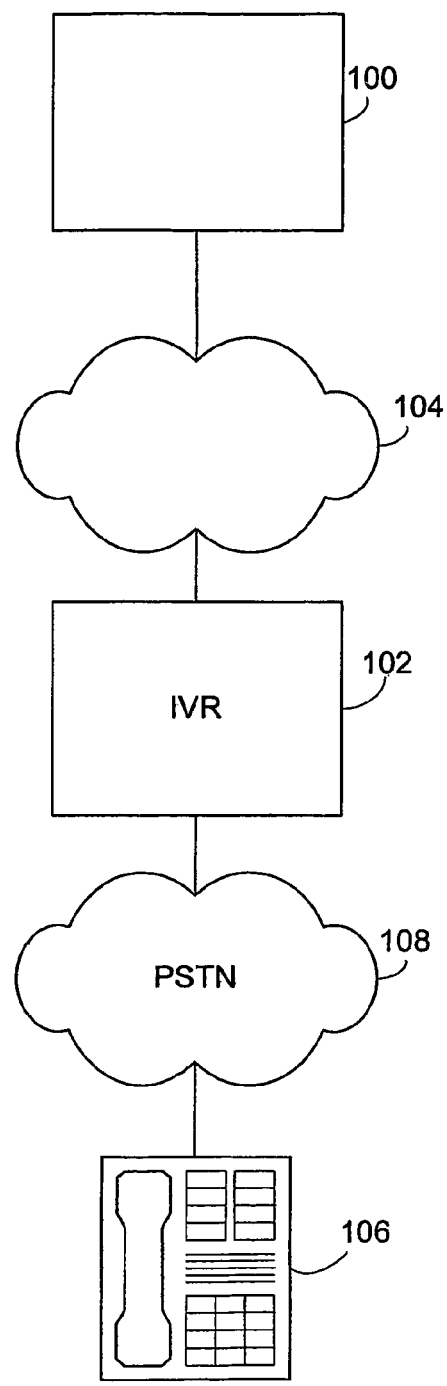
FIG. 1 is a schematic diagram of a preferred embodiment of a natural language application development system connected to an IVR via a communications network, with the IVR connected to a telephone via a telecommunications network.

As shown in FIG. 1, a natural language application development system 100 can be connected to a VoiceXML-enabled interactive voice response system (IVR) 102 via a communications network 104. The development system 100 executes a natural language application development process which allows an application developer to develop a natural language dialog system using a graphical user interface of the development system 100. The development system 100 generates a dialog application that can be installed on the IVR 102 via the network 104 to create and configure the dialog system. A standard telephone 106 can be used to access the IVR 102 via the public switched telephone network (PSTN) 108, allowing a user of the telephone 106 to interact with the natural language dialog system by speaking into the telephone 106 to provide speech input to the dialog system in response to voice prompts provided by the dialog system. Alternatively, the natural language application development system 100 can generate a natural language dialog application for execution by a standard computer system to provide a dialog system that can accept speech (i.e., audio) input or text input.

Figure 2:
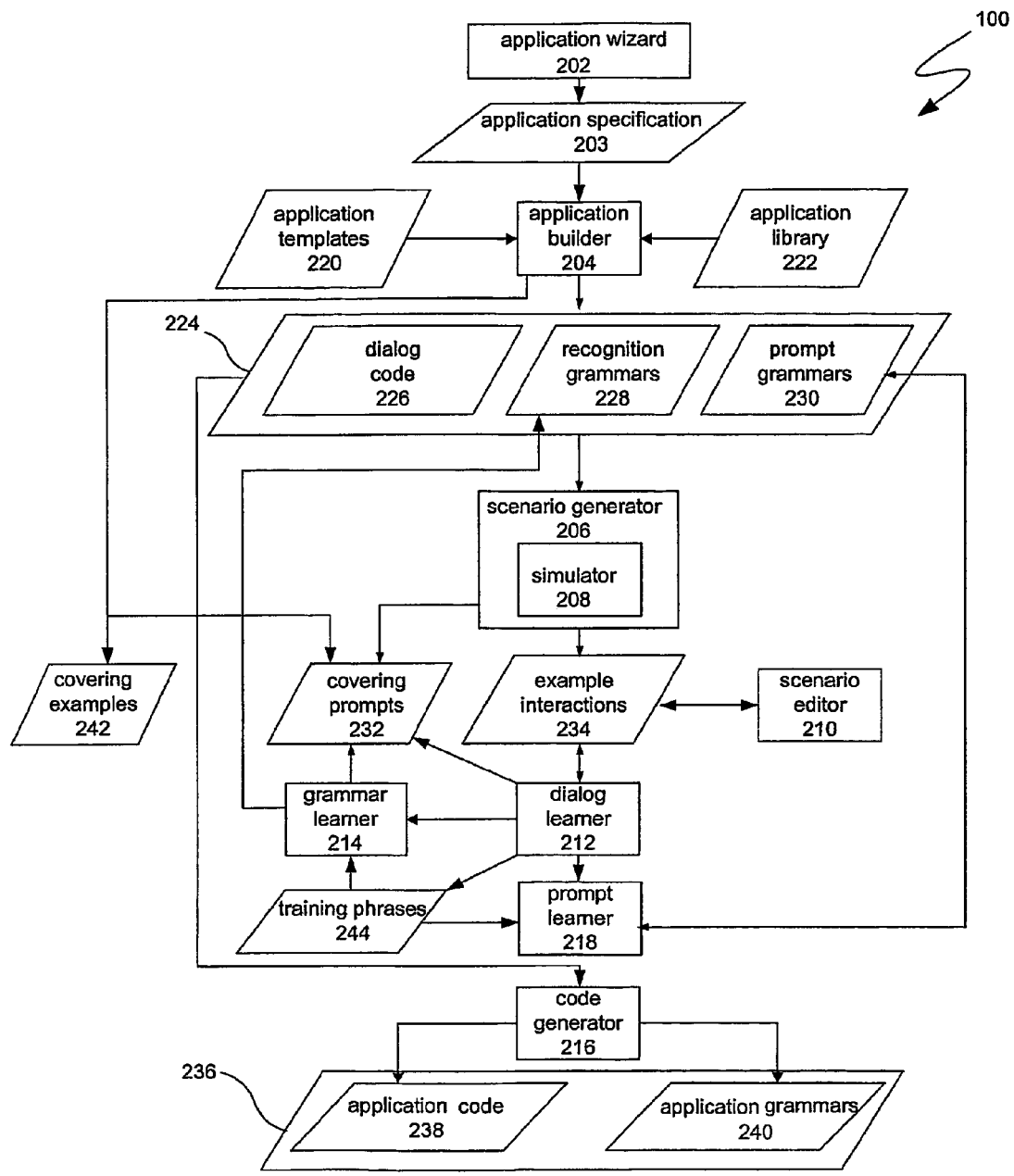
FIG. 2 is a block diagram of the natural language application development system.

In the described embodiment, the natural language application development system 100 is a standard computer system, such as an Intel™ x86-based personal computer executing a Microsoft Windows™ operating system, and the natural language application development process is implemented by software modules, shown in FIG. 2, stored on non-volatile memory of the development system 100. However, it will be apparent to those skilled in the art that at least parts of the natural language application development process or modules can be alternatively implemented by dedicated hardware components such as application-specific integrated circuits (ASICs). The IVR 102 may be a Nortel Periphonics™ IVR. The IVR 102 executes a dialog application that includes VoiceXML language elements. However, the dialog application could include one or more components in any language that can be used to define a spoken dialog application, such as VOXML or a proprietary language. The network 104 can be any communications network that enables the dialog application to be loaded onto the IVR 102, such as an Ethernet LAN or WAN.

As shown in FIG. 2, the application development system 100 includes an application wizard 202, an application builder 204, a scenario generator 206 with a simulator 208, a dialog learner 212, a grammar learner 214, a prompt learner 218, and a code generator 216. The development system 100 also includes an application library 222 and application templates 220. The development system 100 constitutes an integrated development environment (IDE) for the development of natural language applications.

Figure 3:
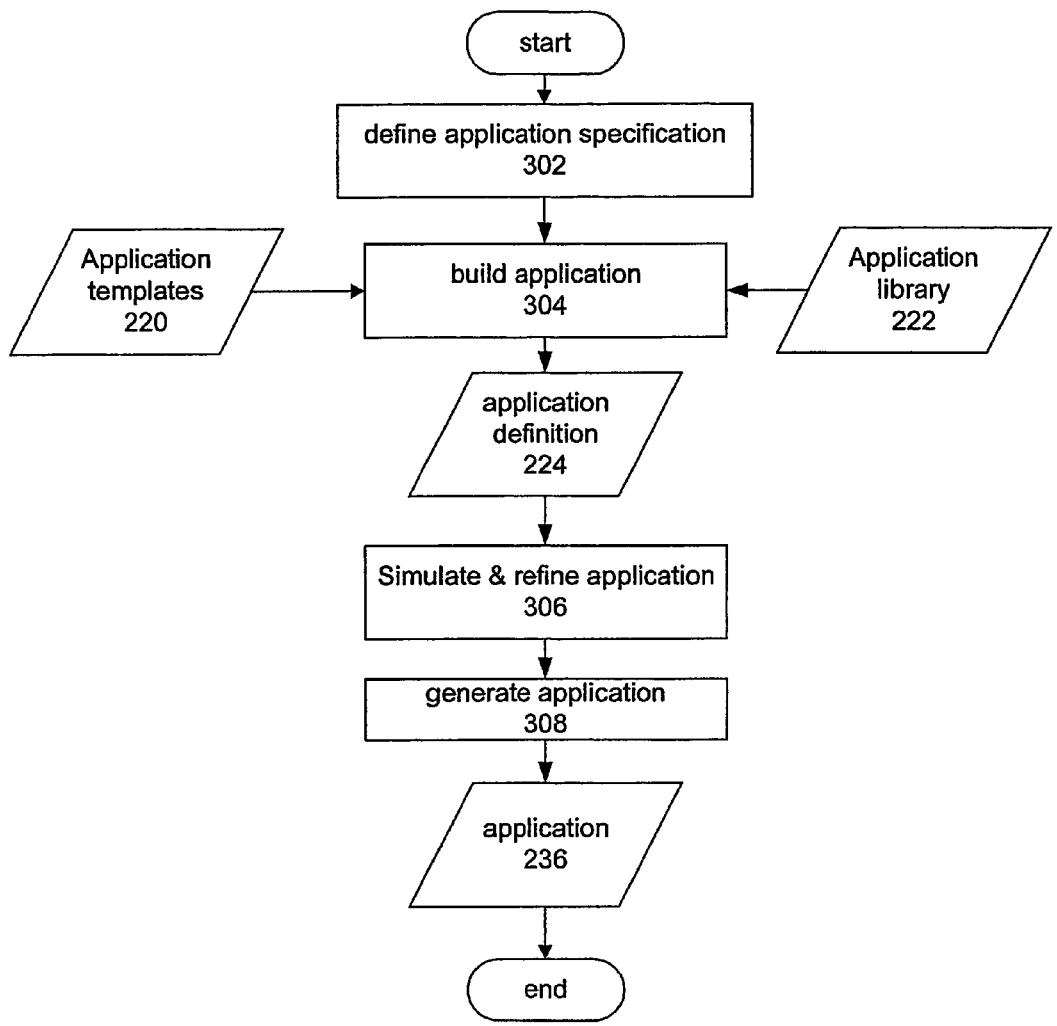
FIG. 3 is a flow diagram of an application development process of the natural language application development system.

The development system 100 executes an application development process, as shown in FIG. 3, that begins at step 302 when the developer defines application specification data 203 describing the dialog application at a high level using the application wizard 202. This includes defining operations or tasks that are to be performed by the dialog system being developed, by providing the name of each corresponding task, along with information that needs to be collected and the information that is created as a result of executing the operation, along with the type of each item of information. For example, the developer can specify that the dialog system is a stock or share system with a "buy" and a "quote" operation. The "buy" operation requires a stock name, a stock quantity and a stock price. The quantity is of predefined type integer and the price is of predefined type money. The values that the stock name can take are defined by providing a list of all available stock names. The developer can also specify a number of predefined options for the dialog system, for example, the developer can specify that the dialog system is not protected by a personal identification number (PIN) and does not allow callers to leave messages or to transfer to an operator.

At step 308, the application builder 204 generates an application definition 224, as described below, from the high level specification data 203 on the basis of rules defined by application templates 220, as described in Starkie. Alternatively, the application definition 224 can be based on an existing dialog application selected by the developer from a list of predefined applications stored in the application library 222. For example, the application library 222 may define a telephone ordering system wherein a user can list products that can be purchased along with their prices and available quantities. The application builder 204 can generate the application definition 224 by adding new code generated from the specification data 203 and an application template 220 to a copy of the selected application from the application library 222. If the selected telephone ordering system includes much of the required functionality of the desired stock application, this can reduce the development time considerably.

As shown in FIG. 2, the application definition 224 includes a description of a dialog state machine 226, recognition grammars 228, and prompt models 230. The dialog state machine 226 is represented in voice extensible markup language, also known as VoiceXML or VXML, as described at http://www.voicexml.org, whereas the recognition grammars 228 and prompt models 230 are represented in a grammar notation, as described in Starkie. Hence the prompt models 230 are also referred to as prompt grammars 230. As described below, the prompt grammars 230 are subsequently converted into a part of the application 236 that converts variables, and a prompt name, into either a text string to be sent to a text-to-speech system of the IVR 102, or a list of pre-recorded audio files that are concatenated together. The dialog state machine 226 defined in VXML can be extremely complex due to the inclusion of a general purpose programming language within the VXML standard.

Figure 4:
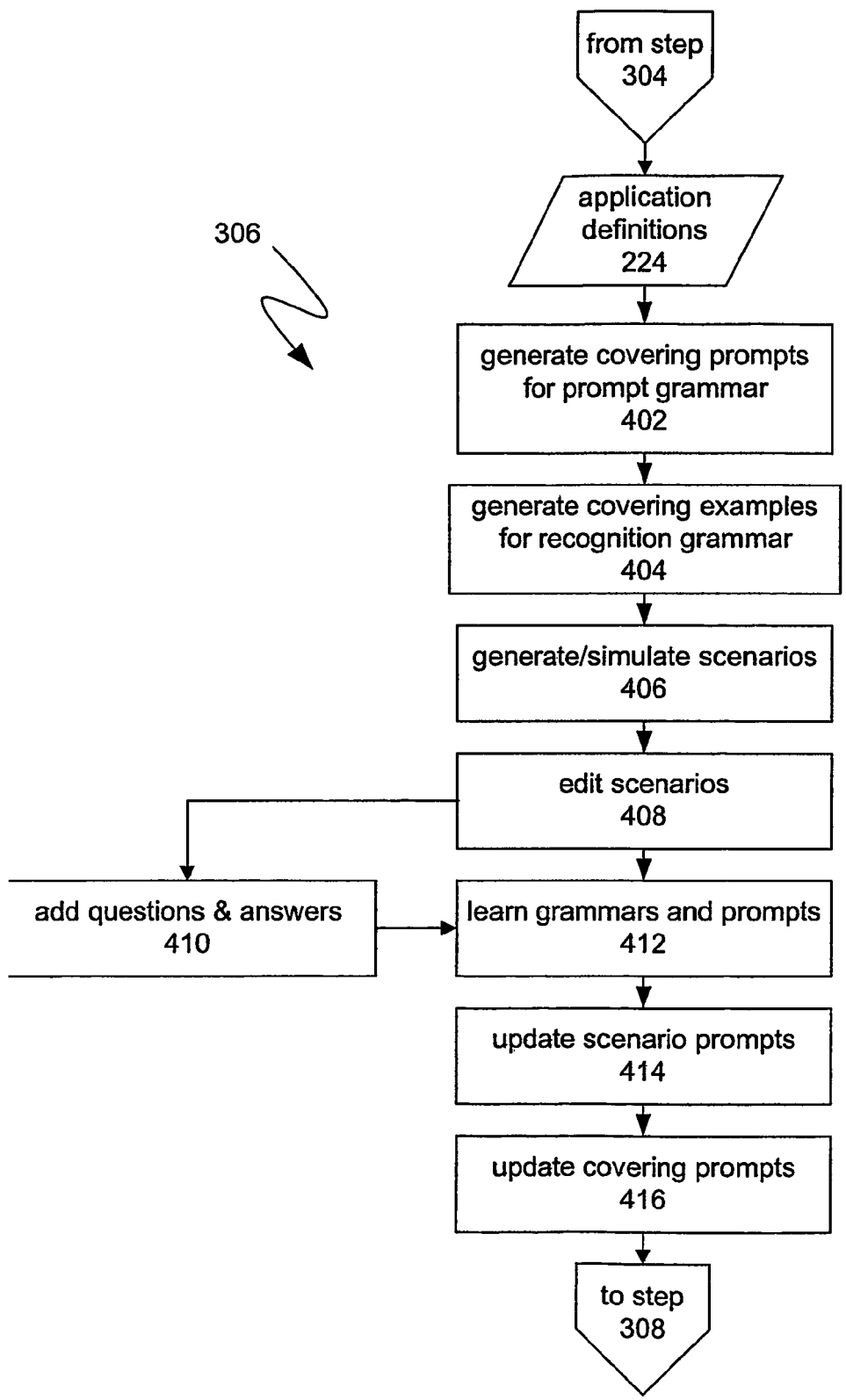
FIG. 4 is a flow diagram of an simulate and refine application process of the application development process.

Once the initial application definition 224 has been generated, it can be simulated and refined at step 306 until the developer is satisfied that it meets the desired requirements. As shown in FIGS. 2 and 4, the simulate and refine application process 306 begins when the application builder 204 generates a set of covering prompts 232 from the prompt grammars 230 at step 402. The covering prompts 232 are examples of prompting sentences for prompting a user of the dialog system to provide a response, and are such that for every rule in the prompt grammars 230 there is at least one corresponding example prompting sentence, as described below. Alternatively, some rules in a prompt grammar extracted from the application library 222 can be annotated prior to their addition to the application library 222 to indicate that they are not to be modified by prompt learning, as described below, in which case no covering examples are required for these rules.

In addition to generating covering prompts 232, at step 404 the application builder 204 also generates a set of covering examples 242 of the recognition grammar 228 to be used for grammar learning, as described in Starkie. That is, the covering examples 242 include at least one example of a possible user response corresponding to each rule in the recognition grammar 228.

The application wizard 202 then invokes the scenario generator 206 to generate scenarios or example interactions 234 at step 406. The scenario generator 206 includes a simulator 208 which can interpret complex VXML scripts. The simulator 208 can operate in two modes. In a first mode, the simulator 208 interacts with the developer using text input and stores the interaction in the form of an example interaction 234. In a second mode, the simulator 208 interacts with the scenario generator 206, so that the scenario generator 206, rather than the developer, provides the input to the simulator 208. The scenario generator 206 is closely coupled to the simulator 208 in order to determine which grammars are active at any point in a dialog. The scenario generator 206 can also determine the scope of a grammar, which indicates whether the grammar is active all the time, or only when it is in a particular dialog state. The scenario generator 206 then attempts to provide enough input to the simulator 208 to create a set of example interactions 234 that are broad enough to give a good representation of the behaviour of the dialog system.

Although the natural language application development system 100 is used to develop dialog systems that are mixed initiative applications (i.e., applications capable of interpreting an input phrase containing multiple pieces of information, and/or accepting input phrases in any sequence, as provided by the speaker), example interactions that are computer directed (i.e., containing a single piece of information and only being provided by the speaker when requested by the application) provide a greater coverage of the number of prompts than example interactions that are mixed initiative. Consequently, the scenario generator 206 first attempts to create example interactions that contain only computer directed dialogs. When executed a second time, the scenario generator 206 attempts to create mixed initiative examples. The scenario generator 206 generates a similar number of mixed initiative examples as the number of computer directed examples.

The aim of the scenario generator 206 is to generate the smallest number of example interactions 234 that cover the majority of the application. The scenario generator 206 takes as its input complex VXML 226 and grammars 228, 230. In addition, the VXML 226 can make reference to logic stored elsewhere. For example, the VXML 226 can call common gateway interface (CGI) scripts, and it can access a database. Although the VXML 226 can be extremely complex, simplifying assumptions can be made that result in a high probability of creating a good covering set of example interactions, even if the assumptions are not true.

Firstly it is assumed that the VXML 226 can be represented by a Markov model. A Markov model is a model that represents a sequence of events. After one particular event has occurred, only a finite number of other events can occur after it, with a given probability. Markov Models are useful for modelling systems in which the sequence of events is random, or when the sequence of events follows some pattern, but where the pattern is too difficult to model. Although Markov Models contain probabilities, the probabilities of the model are ignored by the scenario generator 206. In the model used by the scenario generator 206, an event is a line in an example transaction 234. Each line in an example interaction 234 represents an event: either the dialog system performing a task, or the speaker performing a task. An example interaction is given in appendix B using the notation described in appendix A. Each line in the example interaction can be described by its event type.

For speech recognition events, the name of the event is the same as the name of the corresponding grammar fragment, which comprises the name of the grammar being activated, and the top level nonterminal within that grammar, for example:

"@airline::.Ask_timetablesform_destination_city", where "airline" is the name of the grammar and ".Ask_timetablesform_destination_city" is the name of the top level nonterminal.

For prompt events, the name of the event is the name of the prompt. Where a prompt is also described by a prompt grammar, the name of the prompt event is the name of the prompt grammar fragment, for example:

"@airline.prompts::.Ask_timetablesform_city_of_departure"

A number of names are reserved. For example, the name "@speaker::" is given to an event that represents the playing of prompts that are not represented by a prompt grammar. The names "@startcall::", "@endcall::", and "@hangup::" are given to the events where the dialog system answers a call, the dialog system ends a call, and when the speaker hangs up, respectively. Names of the form "@record::NAME-OF-VARIABLE" are given to events where a developer's response is recorded.

Rather than storing a Markov model to describe the dialog, the scenario generator 206 includes the following three data structures or lists:

(i) a list of all valid speech recognition events (Grammar Fragments), including a flag indicating whether the response to that event is expected to be the same regardless of the prompt played before it, and a count of the number of times that response has been given to the dialog system (i.e., the simulator 208);

(ii) a list of all valid speech recognition events (Grammar Fragments) that can be spoken after each prompt is played; and (iii) a list of example interactions.

The third structure provides the example interactions 234 that are subsequently output by the scenario generator 206, and is used to determine what responses the scenario generator 206 should give at particular points of the dialog.

When generating menu driven example interactions, the scenario generator 206 operates in one of two submodes: a random walk mode, and a playback mode. The scenario generator 206 initially starts in random walk mode, with all three data structures empty. The VXAL state machine dialog 226 is executed by the simulator 208 and the output generated is stored in the list of example interactions.

Figure 5:
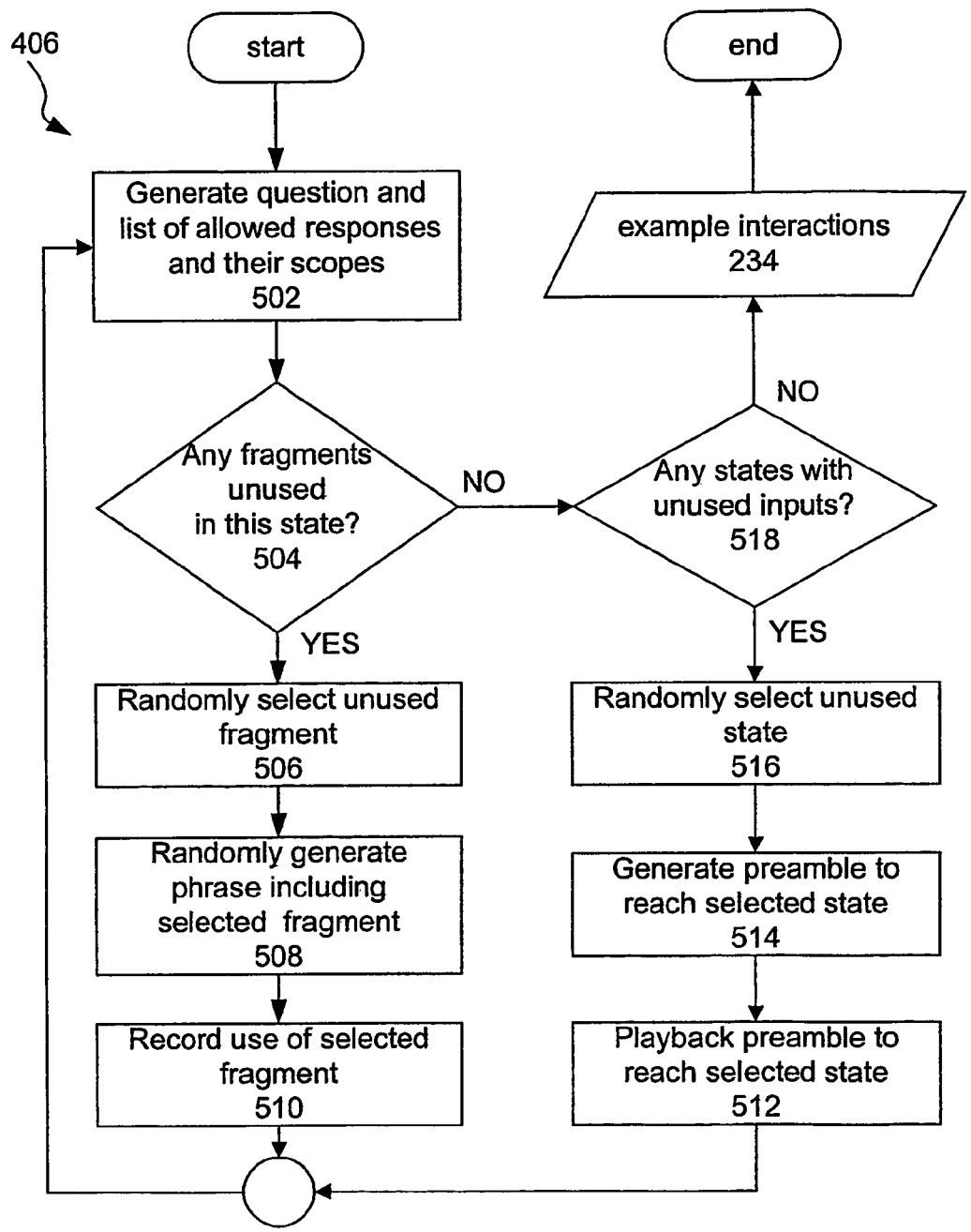
FIG. 5 is a flow diagram of a scenario generation process of the simulate and refine application process.

The example interactions 234 are generated by a scenario generation process, as shown in FIG. 5. At step 502, the simulator 208 provides a question of the dialog to the scenario generator 206, together with a list of allowable responses or grammar fragments, along with the scopes (local or global) of those grammar fragments. The scenario generator 206 uses this information to update its lists of valid speech recognition events. A grammar fragment is classified as global if it is always active and can be spoken at any point. The scenario generator 206 initially assumes that the dialog system responds to global events in the same way, regardless of the question being asked, whereas the dialog system is expected to respond to local events in a different way depending upon the question being asked.

At step 506, the scenario generator 206 randomly selects a grammar fragment that has not been considered in that dialog state, i.e., a fragment that is not represented in the first list with a non-zero count value. At step 508, a phrase is randomly generated using the selected grammar fragment and is passed to the simulator 208. At step 510, the list of used grammar fragments is updated to reflect the use of the selected fragment.

These steps are repeated until all of the grammar fragments have been included in a phrase. If, at step 504, the scenario generator 206 cannot select an unused grammar fragment because all the available fragments have already been considered in that dialog state, the scenario generator 206 then examines the second list at step 518 to determine whether any dialog states exist in which not all available inputs have been considered. If no such states exist, then the third list is saved as example interactions 234 and the scenario generator 206 hangs up. Otherwise, if such states do exist, an unused state is selected at step 516 using the procedure described below, and the scenario generator 206 generates a preamble at step 514. The preamble is a sequence of events that moves the dialog from the state in which all inputs have been considered into the selected state in which not all inputs have been considered. Once the preamble has been executed or played back (at step 512) and the dialog is in the new state, the scenario generator 206 can resume its random walk.

Rather than calculating a preamble from a Markov model, the scenario generator 206 uses a "lazy learning" technique to determine a preamble. A list of target states (T1) is determined from the scenario generator 206's two lists of valid speech recognition events. These states are states representing prompts in which not all inputs have been considered. Then, a list of desirable next inputs (NI) is generated from the two lists of valid speech recognition events. These inputs are valid inputs in that state in which the response of the dialog system is expected to be the same regardless of the previous prompt played.

The scenario starts with the assumption that the dialog system responds to all global grammars the same way regardless of the dialog state. For instance, after the speaker says "quit", the dialog system may quit. The scenario generator can determine from an unsuccessful attempt at a preamble that the assumption is not always true. For instance, the dialog system's response to phrases such as "repeat" and "help" are highly local, despite the grammar fragments being global. Also, not all states have global fragments active: some states are tagged as "Modal", and in such states global fragments are disabled. In addition, the response to some global events can depend on quite complicated preconditions. For instance, in a purchasing application, the dialog system may respond to a "quit" input by asking the speaker whether they want to pay for the goods they have ordered, or quit regardless. This response would only occur if the speaker has ordered something without confirming the purchase prior to saying "quit".

A sequence of previously executed events is then extracted from the list of example interactions, that either:

(i) moves the dialog from the current state to a state in the list T1;

(ii) defines a sequence from an input contained in NI to a state in the list T1, (iii) defines a sequence from the current state to the end state, plus a sequence from the beginning of a call to a state in the list T1; or (iv) defines a sequence from an input contained in NI to the end state, plus a sequence from the beginning of a call to a state in the list T1.

This sequence of previously seen events is used as the preamble.

Because the list of valid speech recognition events for each prompt is populated by experimentation on the part of the scenario generator 206, it only includes a reference to a state if it knows how to reach that state from the beginning of a call. In addition, by the time the scenario generator 206 reaches a state in which all inputs have been considered, it is most likely to have identified a phrase that enables the speaker to end the call. As a result, the list of example interactions is highly likely to contain enough information to determine at least a preamble of the fourth type listed above. The preamble is determined by searching through the list of example interactions from top to bottom, one event at a time, searching for possible preambles. A count is stored that lists the shortest preamble calculated so far. If a preamble is partially identified that is already longer than the previously found preamble, that preamble is rejected. As a result, the time required for determining the shortest preamble is approximately proportional to the length of the data contained in the list of example interactions.

While a preamble is being played back at step 512, the scenario generator 206 checks that the sequence of events being observed is the same as that predicted for the preamble. However, only the event type is examined; the slots and actual text are ignored. When the preamble defines a spoken input, the scenario generator 206 replays them from the preamble. The scenario generator 206 records the actual sequence of events and adds them to the list of example interactions, regardless of whether it is in random walk or playback mode.

If a preamble fails to behave as predicted, it will usually be because the dialog does not respond to a speech event in the same way regardless of the previous prompt played. As a result, the list of valid speech recognition events for each prompt can be updated, and a new preamble identified. If a preamble cannot be identified, the scenario generator 206 saves the list of example interactions 234 and the scenario generation process terminates.

When generating mixed initiative example interactions, the scenario generator 206 randomly generates responses by selecting the least used response to any question and by selecting grammar rules that are likely to produce phrases that have the largest number of slots. The scenario generator 206 generates as many events in the mixed initiative input as there are events in the menu driven inputs.

One limitation of the process described above is that some states can be "hidden" from the scenario generator 206. For example, if the dialog requires a four digit PIN to be spoken, the scenario generator 206 will randomly generate a PIN, and is unlikely to generate the correct PIN. The existence of hidden states can be easily detected by determining the percentage of the total numbers of prompts and grammars used. The total number of prompts and grammar fragments contained within a VXML script can be extracted from the script without requiring any understanding of how the VXML calls these fragments.

One method of overcoming the hidden state problem is to select a larger number of representative examples of a particular event type. While this method is suitable for fragments in which the number of responses is small (such as "Yes" or "No"), it is likely to create an inordinate number of events for fragments in which the number of responses can be large (for example, selecting 1000 different PIN numbers.). Instead, the simulator 208 records and saves the three data structures described above while the simulator 208 is interacting with a human. If the percentage of the application covered by the example interactions generated by the simulator 208 and the scenario generator 206 is too small, the developer is asked to take over from the scenario generator 206 and interact with the simulator 208. Once the developer has reached a previously "hidden" state in the dialog, the scenario generator 206 takes over from the developer and creates additional example interactions. In an alternative embodiment, the developer is asked to interact with the simulator 208. When the developer has completed interacting with the simulator 208, the scenario generator 206 is called again. If the scenario generator 206 determines that an previously hidden states are now visible, it can then determine a preamble to reach that state, and can continue to generate additional example interactions.

Figure 6:
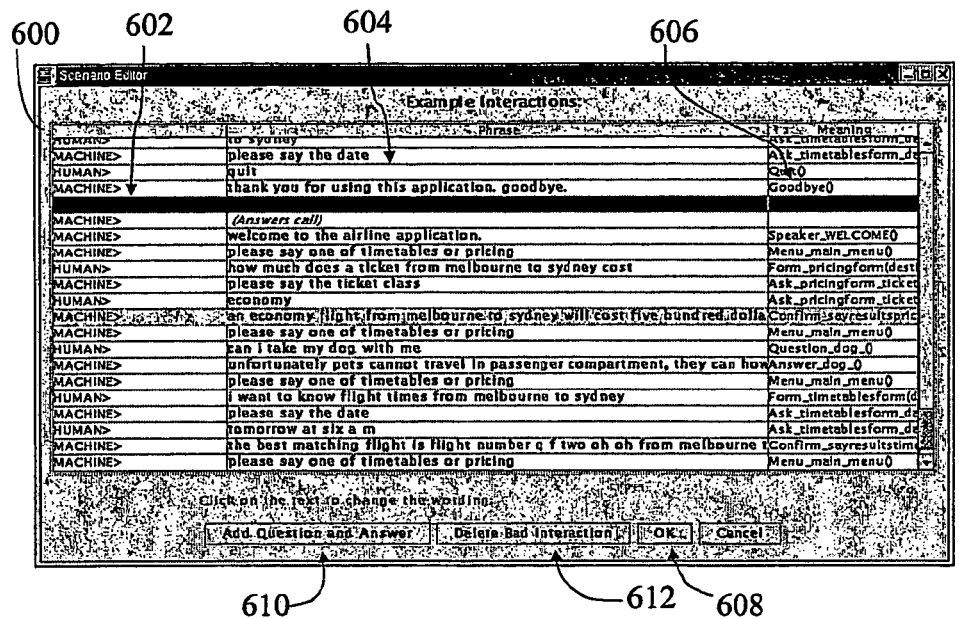
FIGS. 6 to 8 are screenshots of windows generated by the natural language application development system.

Returning to FIG. 4, after the example interactions 234 have been created, the developer can view and modify them using the scenario editor 210 at step 408. As shown in FIG. 6, the scenario editor 210 generates a graphical user interface window 600 displaying the example interactions in an editable table. Each row in the table corresponds to an action taken by either the dialog system or the speaker. The first column 602 indicates whether the action was taken by the dialog system ("MACHINE>") or the speaker interacting with it ("HUMAN>"). The second column 604 indicates either the action type or, in the case of a verbal action, the words used in the action. The text of a verbal action can be modified by the developer. The third column 606 provides any annotations attached to verbal actions.

The developer can edit the contents of the second column 14 to change the words used by a human interacting with the dialog system, as listed in the table. In doing so, the developer specifies an alternative way in which the statement could be phrased by a human interacting with the dialog system. Similarly, the developer can change the words used by the dialog system when interacting with a human. Sentences that have been modified by the developer are annotated in the example interactions 234 as having been modified by the developer.

After the developer has completed editing the scenario, an "OK" button 608 is selected to close the window 600, exit the scenario editor 210, and execute the dialog learner 212 at step 412. The dialog learner 212 extracts all of the sentences in the example interactions 234 that define prompts that have been modified by the developer; these are selected as training sentences for prompt learning. Similarly, if the developer modified example phrases representing how speakers will interact with the dialog system, these example phrases are also added to the set of training phrases 244 for grammar learning. The number of covering prompts 232 is then determined. Every covering prompt 232 is then assigned a count of 1. Every prompt that has been modified by the developer and has been extracted from the example interactions 234 is then given a count equal to the number of covering prompts 232. The dialog learner 212 then invokes the prompt learner 218 to apply prompt learning to update the prompt grammars 230 using grammatical inference, as described in Starkie. The result is an updated prompt grammar 230 that can generate the training examples in the example interactions 234.

After the prompt grammar 230 has been updated, the prompts in the example interactions 234 are updated at step 414. The dialog learner 212 processes the prompts in the example interactions 234, one prompt at a time. If the prompt text has been annotated as having been modified by the developer, the prompt text is left unchanged. If the prompt is annotated as being generated by the scenario generator 206, then the prompt text can be modified as follows. Firstly, the meaning of the prompt as listed in the annotation is used along with the prompt grammar 230 to generate a prompt. If the generated prompt is the same as that listed in the example interaction, no change is made. Alternatively, if the generated prompt differs from that in the example interactions 234, then the two prompts are parsed using the prompt grammar 230, and the probabilities that the prompt grammar 230 would generate the two differing prompts are generated. (The probability that a sentence is generated by a grammar is the product of the probabilities that each rule used to generate the sentence is used to expand a non-terminal. Grammatical inference assigns a probability to newly created rules based upon the probabilities of the training examples 244.) If the probability of the new prompt is greater than or equal to twice the probability of the existing prompt, then the old prompt is replaced by the new prompt.

After the example interactions 234 have been modified, the covering prompts 232 are updated at step 416. Only covering prompts that do not contain slots, as indicated by the prompt annotations, are candidates for updating. As above, using the slots and the prompt grammar 230, a prompt representing the annotations is generated. If the prompt that is generated using the prompt grammar 230 differs from the old prompt, then the respective probabilities of the prompt grammar 230 generating the new and old prompts are generated. If the probability of the new prompt is equal to or greater than the probability of the prompt grammar 230 generating the old prompt, then the prompt is updated. The updating of the covering prompts 232 is undertaken to reduce the size of the prompt grammar 230 by removing entries for generating prompts that will never or rarely be generated in practice because a higher probability prompt will be generated instead. This removal of rules will only occur if the prompt learner 218 is subsequently re-executed.

Similarly, the dialog learner 212 invokes the grammar learner 214 to perform grammar learning on the recognition grammars 228.

Figure 7:
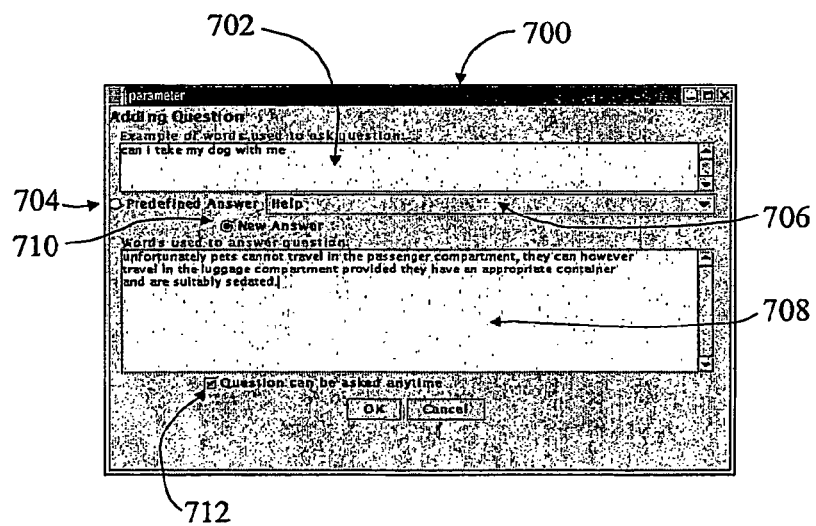

As shown in FIG. 6, the scenario editor 210 also provides an "Add question and answer" button 610 that enables the developer to add one or more questions and answers to the dialog at step 410. To add a question and answer, the developer first must select an entry in the example interaction 234 (as indicated by the shading in FIG. 6) at which to insert an instance of the question being asked. When the "Add question and answer" button 610 is selected, a separate popup window 700, as shown in FIG. 7, is generated, allowing the developer to type in a question and answer. The popup window 700 includes a question text area 702 into which the developer can enter the question text. The developer can then select one of several predefined answers such as context sensitive help, "function not available" or "information not available" by selecting a radio button 704 and selecting a desired predefined answer from a pull-down answer menu 706. Alternatively, the developer can type in the answer to the question in an answer text area 708 and by selecting a new answer radio button 710. A question, such as a Frequently Asked Question (FAQ), can be specified as being able to be asked at any point in the dialog by selecting a "Question can be asked at any time" checkbox 712. Alternatively, questions can be made specific to a particular point in the dialog by unselecting the checkbox 712. The scenario editor 210 determines and stores the name of the prompt that directly precedes the point at which the question is inserted. If the name of this prompt cannot be determined, the question is considered to be able to be asked at any time.

When converted to VXML, questions are implemented using links. Firstly, each question is given a name, based upon the text of the question. To do this, the question text is first copied and then all words appearing in a stop list are removed. Stop lists are used in a number of information retrieval systems and contain the most commonly occurring words. Removal of stop words creates a short sentence that is likely to uniquely represent the question being asked. Whitespace in the name is then replaced with an underscore character. For example, the question "can i take my dog with me" results in a question name of "dog_". If the question name is not unique, it has an integer appended to it to make it unique. A nonterminal of the form ".Question_"+question name is then created. Rather than creating any starting rules during the templating process, as described in Starkie, an example sentence is added to the grammar learning training set 244. After grammar learning is applied to the training set 244 at step 412, the example phrases contained within the grammar learning training set 244 can be generalised to include many other phrases. For instance, if the single sentence "can i take my dog with me" is included in the training set 244 and the starting grammar contains the following rules from the grammar extracted from the application library 222:
!GF_IWantTo i was wondering if i could 1 1
!GF_IWantTo i want to 1 1
!GF_IWantTo can i 3 1
!GF_IWantTo i was hoping to 1 1
then the sentence is generalised to other sentences including: "i want to take my dog with me" and "i was wondering if i could take my dog with me." This generalisation occurs using grammatical inference, as described in Starkie. Because the prompt played to answer a question is fixed, a single rule is added to the prompt grammar 230 by the dialog learner 214.

The VXML is then extended by the dialog learner 212 as follows. Firstly, a link is added to the top of the VXML, e.g.,

```
<link event="FAQNAME" >
    <grammar src="airline.rulelist#Question_FAQNAME"/>
</link>
```

For example,

```
<link event="dog_" >
    <grammar src="airline.rulelist#Question_dog_"/>
</link>
```

Code is then added to the VXML dialog code 226 to catch the event generated by the link, using the following template:

```
<catch event="FAQNAME" >
    <prompt>
        <value expr="PromptAnswer_FAQNAME()"/>
    </prompt>
    <reprompt/>
</catch>
```

For example,

```
<catch event="dog_" >
    <prompt>
        <value expr="PromptAnswer_dog_()"/>
    </prompt>
    <reprompt/>
</catch>
```

If the question can be asked at any time, this code is added directly after the declaration of the link. Alternatively, if the question can only be asked at a specific time in the dialog (i.e., after a particular prompt has been played), the dialog learner 212 adds the event catch tag directly after the point at which that prompt is played.

Figure 8:
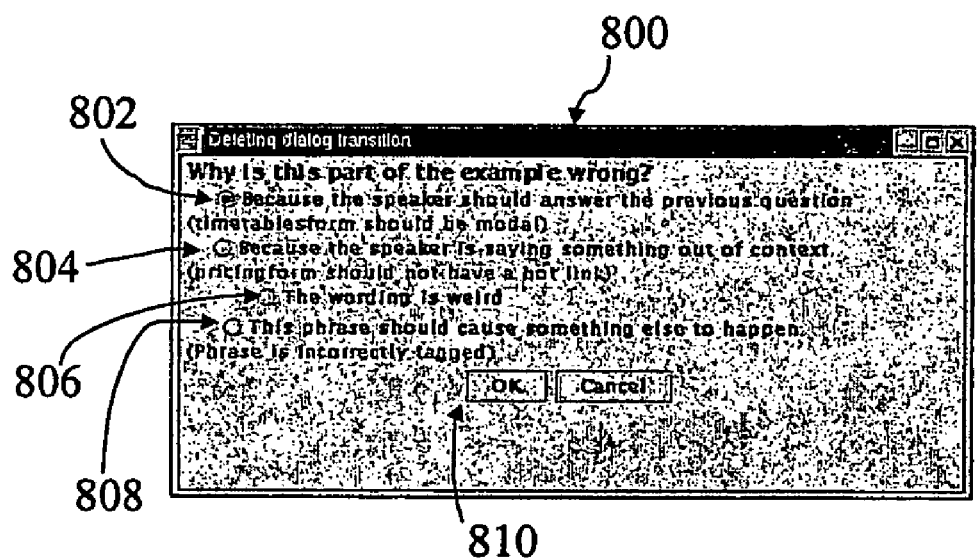

The scenario editor 210 also enables the developer to disallow a person interacting with the dialog system to jump from one part of the dialog to another. To do this, the developer selects a row labelled "HUMAN>" in the scenario editor window 600 and selects a "Delete Bad Interaction" button 612. In response, the scenario editor 210 generates a "Deleting dialog transition" window 800, as shown in FIG. 8. There are many reasons why a transition from one part of a dialog to another may be unsatisfactory, most of them difficult to infer, and always requiring more than one example. In addition to correctly indicate the reason why a particular state transition is invalid, all example interactions need to be tagged consistently. To overcome these difficulties the "Deleting dialog transition" window 800 includes four radio buttons 802 to 808, allowing the developer to select one of these buttons to indicate a reason why the state transition is considered invalid. Some of these reasons can be eliminated by the development system 100 in which case they are therefore not presented to the developer. For instance, the option "(X should not have a hot link)" is only presented to the developer if X has a hot link, and is not presented to the developer if "X" doesn't have a hot link. When an "OK" button 810 is selected, the example interactions 234 and dialog state machine code 226 are modified by the dialog learner 212.

Returning to FIG. 3, after the dialog application has been simulated and refined to the developer's satisfaction, the application 236, including the application code 238 and application grammars 240, is generated from the finalised state machine code 226 and grammars 228 and 230 by the code generator 216 at step 308. The application 236 is then installed on the IVR 102 to provide an executable dialog system.

Many modifications will be apparent to those skilled in the art without departing from the scope of the present invention as herein described with reference to the accompanying drawings.

Appendix A. Example Interaction Notation

The following notation is described using Backus Naur Form

ExampleInteraction: MenuDrivenCalls MixedInitiativeCalls;
MenuDrivenCalls:
MenuDrivenMarker ListOfCalls |
MenuDrivenMarker;
MenuDrivenMarker: '@startmenudriven:: 1';
MixedInitiativeCalls:
EndMenuDrivenMarker ListOfCalls |
EndMenuDrivenMarker
EndMenuDrivenMarker: '@endmenudriven:: 1';
ListOfCalls:
ExampleCall |
ExampleCall ListOfCalls
ExampleCall:
EventList;
EventList:
CallEvent |
CallEvent EventList;
CallEvent:
EventId WordsSpoken Integer Tags
EventId:
'@' GrammarName '::' TopLevelName |
'@' EventName '::';
WordsSpoken:
|
Words |
Words WordsSpoken;
Tags:
|
KeyValuePair |
KeyValuePair Tags;
KeyValuePair:
Key '=' Value;
GrammarName: (any string of characters);
TopLevelName: (any string of characters);
EventName: (any string of characters);
Integer: (an integer);
Words: (any string of characters);
Key: (any string of characters);
Value: (any string of characters);

Appendix B. Example Interaction

@startmenudriven:: 1
@startcall:: 1 1
@airline.prompts::.Speaker_WELCOME welcome to the airline application. 1
@airline.prompts::.Menu_main_menu please say one of timetables or pricing 1
@airline::.Menu_main_menu_timetables timetables 1
@airline.prompts::.Ask_timetablesform_destination_city please say the destination city 1
@airline::.Question_dog_id like to take my dog with me 1
@airline.prompts::.Answer_dog_yes you can take your dog with you. 1
@airline.prompts::.Ask_timetablesform_destination_city please say the destination city 1
@airline::.Question_operator someone please 1
@airline.prompts::.Answer_operator i'm sorry but that functionality is not available in this service 1
@airline.prompts::.Ask_timetablesform_destination_city please say the destination city 1
@airline::.Help what can i say 1
@airline.prompts::.Help_Ask_timetablesform_destination_city please say the destination city. for example, aberdeen 1
@airline::.Ask_timetablesform_destination_city london 1 destination_city="london"
@airline.prompts::.Ask_timetablesform_city_of_departure please say the city of departure 1
@airline::.Form_pricingform pricing 1
@airline.prompts::.Ask_pricingform_destination_city please say the destination city 1
@airline::.Ask_pricingform_destination_city narrabri 1 destination_city="narrabri"
@airline.prompts::.Ask_pricingform_city_of_departure please say the city of departure 1
@airline::.Question_hello hi there um 1
@airline.prompts::.Answer_hello yes hello 1
@airline.prompts::.Ask_pricingform_city_of_departure please say the city of departure 1
@airline::.Quit bye 1
@airline.prompts::.Goodbye thank you for using this application. goodbye. 1
@endcall:: 1 1
@startcall:: 1 1
@airline.prompts::.Speaker_WELCOME welcome to the airline application. 1
@airline.prompts::.Menu_main_menu please say one of timetables or pricing 1
@airline::.Menu_main_menu_pricing pricing 1
@airline.prompts::.Ask_pricingform_destination_city please say the destination city 1
@airline::.Form_timetablesform timetables 1
@airline.prompts::.Ask_timetablesform_destination_city please say the destination city 1
@airline::.Repeat what did you say 1
@airline.prompts::.Ask_timetablesform_destination_city please say the destination city 1
@airline::.Ask_timetablesform_destination_city london 1 destination_city="london"
@airline.prompts::.Ask_timetablesform_city_of_departure please say the city of departure 1
@airline::.Ask_timetablesform_city_of_departure coolangatta 1 city_of_departure="coolangatta"
@airline.prompts::.Ask_timetablesform_date please say the date 1
@airline::.Ask_timetablesform_date last wednesday 1 date.day_of_week="wednesday" date.modifier="last"
@airline.prompts::.Ask_timetablesform_time please say the time 1

@airline:::.Ask_timetablesform_time half past twelve in the evening 1 time.hours=12 time.am_or_pm=pm time.minutes=30
@airline.prompts:::.Confirm_sayresultstimetables the flight number is undefinedundefinedtwo oh oh the destination city is london the city of departure is coolangatta the date is last wednesday the time is twelve thirty in the afternoon 1
@airline.prompts:::.Menu_main_menu please say one of timetables or pricing 1
@airline:::.Question_hello hi there um 1
@airline.prompts:::.Answer_hello yes hello 1
@airline.prompts:::.Menu_main menu please say one of timetables or pricing 1
@airline:::.Question_hello yeah well then 1
@airline.prompts:::.Answer_hello yes hello 1
@airline.prompts:::.Menu_main_menu please say one of timetables or pricing 1
@airline:::.Form_pricingform pricing 1
@airline.prompts:::.Ask_pricingform_destination_city please say the destination city 1
@airline:::.Ask_pricingform_destination_city narrabri 1 destination_city="narrabri"
@airline.prompts:::.Ask_pricingform_city_of_departure please say the city of departure 1
@airline:::.Ask_pricingform_city_of_departure nine hundred 1 city_of_departure="900"
@airline.prompts:::.Ask_pricingform_ticket_class please say the ticket class 1
@airline:::.Question_hello okay hi uh 1
@airline.prompts:::.Answer_hello yes hello 1
@airline.prompts:::.Ask_pricingform_ticket class please say the ticket class 1
@airline:::.Ask_pricingform_ticket_class economy 1 ticket_class="economy"
@airline.prompts:::.Confirm_sayresultspricing the destination city is narrabri the city of departure is nine oh oh the ticket class is economy the price is five hundred dollars 1 price.dollars=500 destination_city="narrabri" ticket_class="economy" price.cents=0 city_of_departure="900"
@airline.prompts:::.Menu_main_menu please say one of timetables or pricing 1
@airline:::.Form_pricingform pricing 1
@airline.prompts:::.Ask_pricingform_destination_city please say the destination city 1
@airline:::.Ask_pricingform_destination_city narrabri 1 destination_city="narrabri"
@airline.prompts:::.Ask_pricingform_city_of_departure please say the city of departure 1
@airline:::.Question_hello hi 1
@airline.prompts:::.Answer_hello yes hello 1
@airline.prompts:::.Ask_pricingform_city_of_departure please say the city of departure 1
@hangup:: 1 1
@endmenudriven:: 1
@startcall:: 1
@airline.prompts:::.Speaker_WELCOME welcome to the airline application. 1
@airline.prompts:::.Menu_main_menu please say one of timetables or pricing 1
@airline:::.Form_timetablesform timetables 1
@airline.prompts:::.Ask_timetablesform_destination_city please say the destination city 1
@airline:::.Ask_timetablesform_destination_city portland oregon 1 destination_city="portland oregon"
@airline.prompts:::.Ask_timetablesform_city_of_departure please say the city of departure 1

@airline:::.Ask_timetablesform_city_of_departure suva 1 city_of_departure="suva"
@airline.prompts:::.Ask_timetablesform_date please say the date 1
@airline:::.Ask_timetablesform_date the ninth of july 1 date.day=9 date.month="july"
@airline.prompts:::.Ask_timetablesform_time please say the time 1
@airline:::.Ask_timetablesform_time thirteen twenty eight 1 time.hours=13 time.am_or_pm=pm time.minutes=28
@airline.prompts:::.Confirm_sayresultstimetables the flight number is undefinedundefinedtwo oh oh the destination city is portland oregon the city of departure is suva the date is ninth of july the time is thirteen twenty eight 1
@airline.prompts:::.Menu_main_menu please say one of timetables or pricing 1
@airline:::.Form_timetablesform timetables 1
@airline.prompts:::.Ask_timetablesform_destination_city please say the destination city 1
@airline:::.Form_pricingform pricing 1
@airline.prompts:::.Ask_pricingform_destination_city please say the destination city 1
@airline:::.Form_timetablesform timetables 1
@airline.prompts:::.Ask_timetablesform_destination_city please say the destination city 1
@airline:::.Ask_timetablesform_destination_city broome 1 destination_city="broome"
@airline.prompts:::.Ask_timetablesform_city_of_departure please say the city of departure 1
@airline:::.Ask_timetablesform_city_of_departure albury 1 city_of_departure="albury"
@airline.prompts:::.Ask_timetablesform_date please say the date 1
@airline:::.Ask_timetablesform_date twenty fifth of the month 1 date.day=25
@airline.prompts:::.Ask_timetablesform_time please say the time 1
@airline:::.Ask_timetablesform_time twelve fifty at night 1 time.hours=12 time.am_or_pm=pm time.minutes=50
@airline.prompts:::.Confirm_sayresultstimetables the flight number is undefinedundefinedtwo oh oh the destination city is broome the city of departure is albury the date is the twenty fifth day of the month the time is twelve fifty in the afternoon 1
@airline.prompts:::.Menu_main_menu please say one of timetables or pricing 1
@airline:::.Form_pricingform pricing 1
@airline.prompts:::.Ask_pricingform_destination_city please say the destination city 1
@airline:::.Ask_pricingform_destination_city dublin 1 destination_city="dublin"
@airline.prompts:::.Ask_pricingform_city_of_departure please say the city of departure 1
@airline:::.Ask_pricingform_city_of_departure h seventeen three thousand 1 city_of_departure="h173000"
@airline.prompts:::.Ask_pricingform_ticket_class please say the ticket class 1
@airline:::.Ask_pricingform_ticket_class economy 1 ticket_class="economy"
@airline.prompts:::.Confirm_sayresultspricing the destination city is dublin the city of departure is h one seven three oh oh oh the ticket class is economy the price is five hundred dollars 1 price.dollars=500 destination_city="dublin" ticket_class="economy" price.cents=0 city_of_departure="h173000"
@airline.prompts:::.Menu_main_menu please say one of timetables or pricing 1

@airline:::.Form_timetablesform timetables 1
@airline.prompts:::.Ask_timetablesform_destination_city please say the destination city 1
@airline:::.Ask_timetablesform_destination_city tom price 1 destination_city="tom price"
@airline.prompts:::.Ask_timetablesform_city_of_departure please say the city of departure 1
@airline:::.Ask_timetablesform_city_of_departure belfast 1 city_of_departure="belfast"
@airline.prompts:::.Ask_timetablesform_date please say the date 1
@airline:::.Ask_timetablesform_date this coming Wednesday 1 date.day_of_week="wednesday"
@airline.prompts:::.Ask_timetablesform_time please say the time 1
@airline:::.Ask_timetablesform_time one oh one a m 1 time.hours=1 time.am_or_pm=am time.minutes=1
@airline.prompts:::.Confirm_sayresultstimetables the flight number is undefinedundefinedtwo oh oh the destination city is tom price the city of departure is belfast the date is wednesday the time is one oh one in the morning 1
@airline.prompts:::.Menu_main_menu please say one of timetables or pricing 1
@airline:::.Form_pricingform pricing 1
@airline.prompts:::.Ask_pricingform_destination_city please say the destination city 1
@airline:::.Ask_pricingform_destination_city detroit 1 destination_city="detroit"
@airline.prompts:::.Ask_pricingform_city_of_departure please say the city of departure 1
@airline:::.Ask_pricingform_city_of_departure five hundred 1 city_of_departure="500"
@airline.prompts:::.Ask_pricingform_ticket_class please say the ticket class 1
@airline:::.Ask_pricingform_ticket_class business 1 ticket_class="business"
@airline.prompts:::.Confirm_sayresultspricing the destination city is detroit the city of departure is five oh oh the ticket class is business the price is five hundred dollars 1 price.dollars=500 destination_city="detroit" ticket_class="business" price.cents=0 city_of_departure="500"
@airline.prompts:::.Menu_main_menu please say one of timetables or pricing 1
@airline:::.Form_timetablesform timetables 1
@airline.prompts:::.Ask_timetablesform_destination_city please say the destination city 1
@airline:::.Ask_timetablesform_destination_city taree 1 destination_city="taree"
@airline.prompts:::.Ask_timetablesform_city_of_departure please say the city of departure 1
@airline:::.Ask_timetablesform_city_of_departure paris 1 city_of_departure="paris"
@airline.prompts:::.Ask_timetablesform_date please say the date 1
@airline:::.Ask_timetablesform_date friday 1 date.day_of_week="friday"
@airline.prompts:::.Ask_timetablesform_time please say the time 1
@airline:::.Ask_timetablesform_time twenty two twenty four 1 time.hours=22 time.am_or_pm=pm time.minutes=24
@airline.prompts:::.Confirm_sayresultstimetables the flight number is undefinedundefinedtwo oh oh the destination city is taree the city of departure is paris the date is friday the time is twenty two twenty four 1
@airline.prompts:::.Menu_main_menu please say one of timetables or pricing 1
@hangup:: 1

The invention claimed is:

1. A process for developing a dialog application for an interactive voice response system and executed by a computer system, comprising:
   accessing application specification data for the dialog application, the application specification data defining tasks performed by the dialog application, items of information needed for the tasks, and information created by executing the tasks;
   processing the application specification data to generate application definition data defining a dialog state machine, recognition grammars, and prompt grammars for the dialog application;
   processing the application definition data to generate a plurality of example interactions representative of interactions between said dialog application and a user of said dialog application, wherein the plurality of the example interactions includes at least one example of a possible prompt corresponding to each rule of a plurality of rules of the prompt grammars, and at least one example of a possible user response corresponding to each rule of a plurality of rules of the recognition grammars;
   providing the generated example interactions to a user for modification;
   receiving the modified example interactions from the user;
   processing the modified example interactions to update the recognition grammar, the prompt grammar, and the state machine;
   generating the dialog application from the updated state machine and the updated recognition grammars and the updated prompt grammars; and
   storing the generated dialog application in a memory device.

2. The process of claim 1, wherein said processing the application definition data to generate includes automatically generating a plurality of prompts on the basis of said application definition data, providing said prompts to a user, and receiving responses to said prompts from said user.

3. The process of claim 1, wherein said processing the application definition data to generate includes automatically generating a plurality of prompts on the basis of said application definition data, and automatically generating responses to said prompts on the basis of said application definition data.

4. The process of claim 3, wherein said processing the application definition data to generate a plurality of example interactions includes generating first example interactions, each of said first example interactions including interaction text and one item of application data; and subsequently generating second sample interactions, each of said second sample interactions including interaction text and two or more items of application data.

5. The process of claim 3, wherein said processing the application definition data to generate a plurality of example interactions includes generating a plurality of prompts and respective lists of possible responses to said prompts, and selecting responses from said lists.

6. The process of claim 5, wherein said selecting includes randomly selecting unselected responses from said lists.

7. The process of claim 5, including identifying a dialog state with at least one unselected response, and determining a sequence of events for entering said dialog state.

8. The process of claim 7, wherein said sequence of events is determined on the basis of example interactions.

9. The process of claim 7, wherein said determining includes determining a first sequence of events for reaching an end dialog state and a second sequence of events for reaching said dialog state from an initial dialog state.

10. The process of claim 7, including determining two or more sequences of events for entering said dialog state and selecting from said two or more sequences to determine an event sequence with the least number of events.

11. The process of claim 7, wherein said determining a sequence of events for entering said dialog state includes providing one or more prompts to a user and receiving one or more responses from said user.

12. The process of claim 7, including generating events on the basis of said sequence to enter said dialog state.

13. The process of claim 3, wherein said automatically generating a plurality of prompts includes selecting grammar rules of said prompt grammars to generate prompts that are likely to have responses having the largest numbers of items of information.

14. The process of claim 1, wherein said example interactions include interaction text and application data.

15. The process of claim 1, wherein said recognition grammars and prompt grammars are updated using grammar learning.

16. The process of claim 1, including selecting prompts of said example interactions for updating only if said prompts have not been modified by a developer.

17. The process of claim 1, wherein said application definition data is generated on the basis of said application specification data and and at least one dialog application template.

18. A computer readable non-transitory storage medium having stored thereon program instructions for executing the process of claim 1.

19. A development system for developing a dialog application for an interactive voice response system, and comprising:
an application builder configured to process application specification data defining tasks performed by the dialog application, items of information needed for the tasks, and information created by executing the tasks to generate application definition data defining a dialog state machine, recognition grammars, and prompt grammars for the dialog application;
a scenario generator configured to process the application definition data to a plurality of example interactions representative of interactions between said dialog application and a user of said dialog application, wherein the plurality of the example interactions includes at least one example of a possible prompt corresponding to each rule of a plurality of rules of the prompt grammars, and at least one example of a possible user response corresponding to each rule of a plurality of rules of the recognition grammars;
a scenario editor including graphical user interface components for modifying said example interactions;
one or more learning components configured to process the modified example interactions to update the recognition grammars, the prompt grammars, and the state machine;
a code generator configured to generate the dialog application from the updated state machine, the updated recognition grammars, and the updated prompt grammars.

20. The development system of claim 19, including a simulator for generating prompts of said example interactions on the basis of said prompt grammars, and wherein said scenario generator is configured to generate responses to said prompts on the basis of said recognition grammars.

21. The development system of claim 19, wherein said application builder is configured to selectably generate said application definition data from said application specification data and, an application template, or from an existing application.

22. A dialogue application generated by the development system of claim 19.

23. The development system of claim 19, wherein said graphical user interface components include a component for deleting a selected example interaction.

24. The development system of claim 23, wherein said graphical user interface components include a component for a developer to select a predetermined reason why said selected example interaction was deleted.

25. The development system of claim 19, wherein said graphical user interface components include a component for defining a question and an answer to said question for display to a user of said dialog system.

26. The development system of claim 25, wherein said graphical user interface components include a question text component for defining question text and an answer text component for defining answer text.

27. The development system of claim 25, wherein said graphical user interface components include a component for selecting from a list of predetermined answers to said question.

28. The development system of claim 25, wherein said graphical user interface components include a component for specifying whether said question can be asked at any time.

29. The development system of claim 25, wherein said graphical user interface components include a component for specifying that said question can be asked during a selected example interaction.

* * * * *